United States Patent
Kaizu

(10) Patent No.: US 7,321,438 B2
(45) Date of Patent: Jan. 22, 2008

(54) PARALLEL PROCESSING FOR A FIRST AND SECOND IMAGE DATA FROM ONE INPUT IMAGE

(75) Inventor: Shunichi Kaizu, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1024 days.

(21) Appl. No.: 10/050,780

(22) Filed: Jan. 18, 2002

(65) Prior Publication Data

US 2002/0097916 A1    Jul. 25, 2002

(30) Foreign Application Priority Data

Jan. 23, 2001    (JP)    ............... 2001-014623

(51) Int. Cl.
*G06K 9/36*    (2006.01)
(52) U.S. Cl. .................. 358/1.15; 358/1.16; 358/1.17; 345/418; 345/503; 345/589; 382/232
(58) Field of Classification Search ............... 358/1.15, 358/1.16, 1.17; 345/418, 503, 589; 382/232
See application file for complete search history.

(56) References Cited

U.S. PATENT DOCUMENTS 5,687,332 A * 11/1997 Kurahashi et al. .......... 715/706
6,433,885 B1 * 8/2002 Verghese et al. ........... 358/1.15

\* cited by examiner

*Primary Examiner*—King Y. Poon
*Assistant Examiner*—Peter K Huntsinger
(74) *Attorney, Agent, or Firm*—Fitzpatrick, Cella, Harper & Scinto

(57) ABSTRACT

In an image processing apparatus, connected via an external bus to at least an external controller and an external storage device, input image data is processed by an image processor 2, then processed image data 1 and image data 2 are simultaneously stored into respective areas of an image buffer 4. The image data 1 is read from the image buffer 4 while it is stored in the image buffer, and the read image data 1 is processed by an image processor 5. The image data is outputted through an image output controller 6 and a bus I/F unit 1 to an external storage device 903 via an external bus 101. At this time, the result of processing on frame data by the image processor is preserved in correspondence with output of the image data 1 for one frame, and image processing and output processing on the image data 2 stored in the image buffer, for one frame, is started.

19 Claims, 5 Drawing Sheets

PARALLEL PROCESSING FOR A FIRST AND SECOND IMAGE DATA FROM ONE INPUT IMAGE

FIELD OF THE INVENTION

The present invention relates to an image processing method, an image processing apparatus, an image processing program and a storage medium holding image processing program code for sequentially processing supplied image data and outputting the processed data via a bus.

BACKGROUND OF THE INVENTION

In an image processing apparatus which internally generates two types of image data ("image data 1" and "image data 2") from one input image, processes these image data, then further processes the image data and outputs them via an external bus, the "image data 1" is temporarily stored in an image buffer, then subjected to image processing by an image processor, and the "image data 1" is transferred to an external storage device via the external bus. The processing on the "image data 1" is continued until all the "image data 1" for one frame has been processed and transferred to the external storage device.

On the other hand, while processing of the "image data 1", the "image data 2" is generated and processed and then stored in the image buffer, thus all the "image data 2" is stored into the image buffer.

Then, when the image processing on the "image data 1" and data transfer of the "image data 1" have been completed, the image processing apparatus issues an interrupt request (exceptional processing request) to an external (other than the image processing apparatus) controller (e.g. CPU) connected to the external bus. In response to the interrupt request, the external controller performs re-setting on the image processing apparatus for processing the "image data 2". When the re-setting processing has been completed, the processing on the "image data 2" is started in the image processing apparatus. The "image data 2" is read from the image buffer, subjected to the image processing by the image processor, and transferred to the external storage device via the external bus.

Further, when the image processing on the "image data 2" and data transfer of the "image data 2" have been completed, the image processing apparatus again issues an interrupt request to the external controller. In response to the interrupt request, the external controller performs re-setting on the image processing apparatus for processing the next input data.

In this conventional image processing apparatus, since the image processing on the "image data 2" is started after the completion of data transfer of the "image data 1" to the external storage device, suspension time of the image processing before the start of image processing on the "image data 2" becomes long, and efficiency of the image data processing is low.

Further, the controller, connected to the external bus on which the image data is transferred, starts reception processing by the interrupt indicating a request for reception of processed image data, issued from the image processing apparatus which has processed the image data. Accordingly, in the controller, the processing which has been performed by that moment is suspended, and efficiency of processing is degraded.

SUMMARY OF THE INVENTION

The present invention has been made in consideration of the above conventional art, and has its object to provide an image processing method, an image processing apparatus, an image processing program and a storage medium holding image processing program code for improving the efficiency of image data processing by reducing the suspension time of the image processing.

Further, another object of the present invention is to provide an image processing method, an image processing apparatus, an image processing program and a storage medium holding image processing program code for increasing processing throughput by reducing suspension of processing in a controller connected to an external bus for transfer of processed image data.

In order to attain the objects of the present invention, the image processing apparatus of the present invention comprising the structures as follows:

An image processing apparatus connected to at least an external controller via an external bus, comprising: first image processing means for processing input image data; image storage means for storing image data processed by the first image processing means; second image processing means for processing image data read from the image storage means; output control means for outputting image data processed by the second image processing means via the external bus; preservation means for preserving the result of processing on the image data by the second processing means, in correspondence with a predetermined amount of image data output by the output control means; and pseudo master means for starting and controlling a preservation operation by the preservation means, in correspondence with the predetermined amount of image data output by the output control means.

In order to attain the objects of the present invention, the image processing method of the present invention comprising the steps as follows:

An image processing method in an image processing apparatus connected to at least an external controller via an external bus, comprising: a first image processing step of processing input image data; an image storage step of storing image data processed at the first image processing step into an image memory; a second image processing step of processing image data read from the image memory; an output control step of outputting image data processed at the second image processing step via the external bus; a preservation step of preserving the result of processing on the image data processed at the second processing step, in correspondence with a predetermined amount of image data output at the output control step; and a pseudo master step of starting and controlling a preservation operation at said preservation step, in correspondence with the predetermined amount of image data output at the output control step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
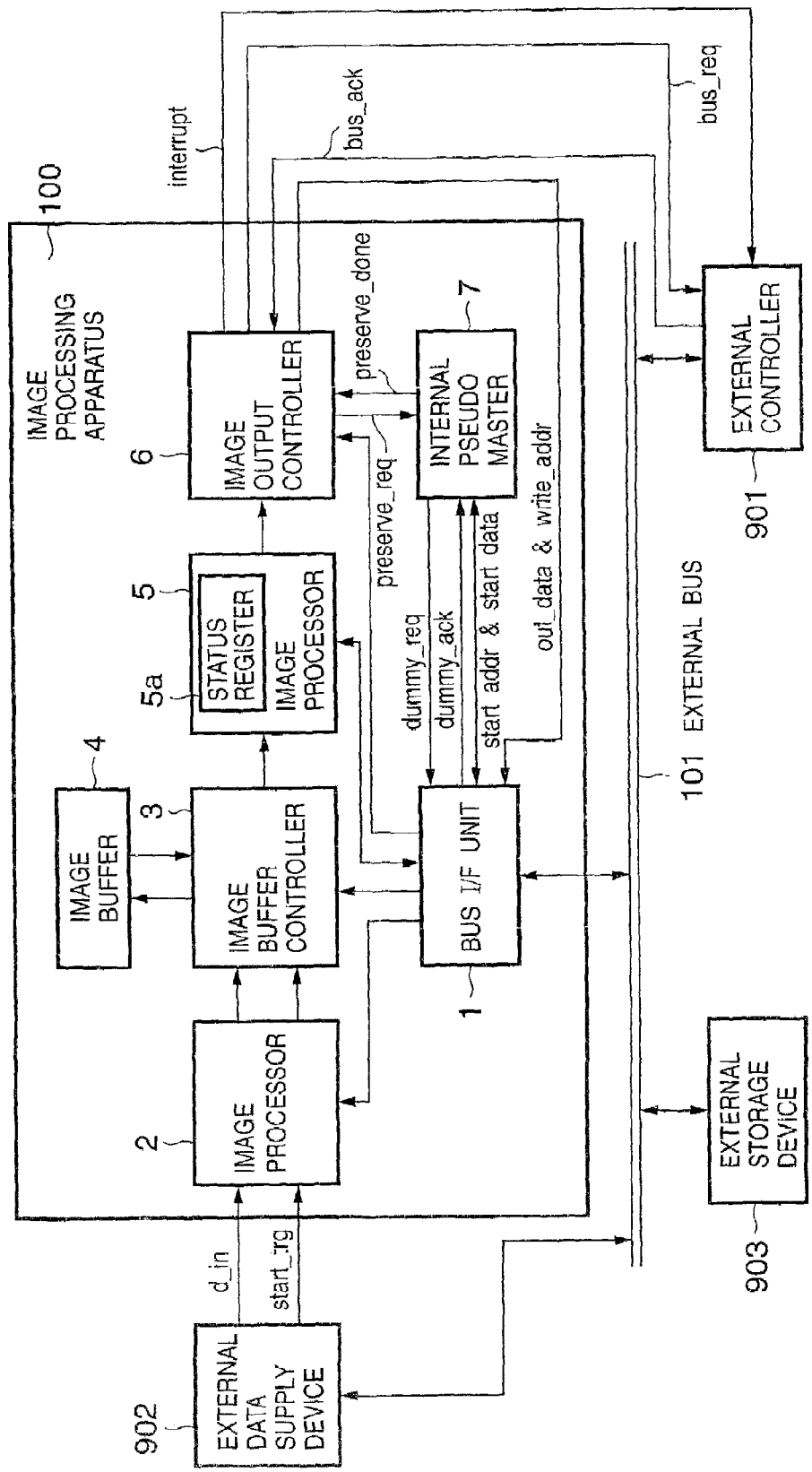
FIG. 1 is a block diagram showing the construction of an image processing apparatus according to a first embodiment of the present invention.

FIG. 1 is a block diagram schematically showing the construction of an image processing apparatus according to the first embodiment of the present invention.

First, the overview of the entire construction will be described.

An external controller (e.g. CPU) 901, an external data supply device 902 and an external storage device 903, in addition to an image processing apparatus 100 of the present embodiment, are connected to an external bus 101. Among these devices, the external controller 901 and the image output controller 6 of the image processing apparatus 100 can be a bus master of the external bus 101, and the external data supply device 902 and the external storage device 903 are always bus slaves.

The external controller 901 performs arbitration for the external bus 101. When the image processing apparatus 100 transfers processed image data via the external bus 101 to the external storage device 903, first, the image output controller 6 issues an output request signal (bus_req) to the external controller 901. Next, when the external controller 901 issues an output acknowledgment signal (bus_ack), the image output controller 6 transfers the processed image data to the external storage device 903. The data transfer is repeated by e.g. in 4 or 8 words unit, until the image processing has been completed.

Note that the image processing apparatus 100 of the present embodiment is connected to the external bus 101 via a pair of address port and data port. As the same port is used upon bus master operation and bus slave operation, a bus interface (I/F) unit 1 is internally provided with means for changing path of address and path of data and port input/output direction.

On the other hand, image data (d_in) is supplied from the external data supply device 902 at a preceding stage connected to the image processing apparatus 100. When the supply of the image data (d_in) is started, first, a data supply start command is issued from the external controller 901 via the external bus 101 to the external data supply device 902. The external data supply device 902 issues an image processing start trigger (start_trg) to the image processor 2, and the supply of the image data (d_in) is started.

In FIG. 1, the bus interface (I/F) unit 1 controls transmission of data and control signals via the external bus 101 between the apparatus and the external storage device 903 connected to the external bus 101. The image processor 2 inputs the image data (d_in) from the external data supply device 902, starts processing on the image data by the image processing start trigger (start_trg), which is parallel processing to generate two types of image data ("image data 1" and "image data 2") as processing results, and supplies the image data to an image buffer controller 3.

Note that the external data supply device 902 is applicable to an electronic camera which generates image data by performing image sensing on a subject, and a network communication device which inputs image data via a network (e.g. the Internet).

The image buffer controller 3 stores the respective "image data 1" and the "image data 2" into the image buffer 4.

Note that the "image data 1" and the "image data 2" are simultaneously generated (to be more exact, generated in parallel within the same time period). That is, in the present embodiment, two image data ("image data 1" and "image data 2") are simultaneously generated in parallel from one original in the apparatus, and the "image data 2", e.g., corresponds to image data obtained by resolution conversion, filtering and the like on the "image data 1". The "image data 2" is used, e.g., as a thumb nail image upon search for the "image data 1".

Another image processor 5 performs image processing on image data read from the image buffer 4 under the control of the image buffer controller 3, and outputs the image data resulted from the processing to the image output controller 6. When the image data is supplied to the image output controller 6 from the image processor 5 and the image output controller 6 is instructed to output the image data via the external bus 101, the image output controller 6 first issues an output request signal (bus_req) to the external controller 901. Next, when the external controller 901 issues an output acknowledgment signal (bus_ack), the image output controller 6 outputs the output image data (out_data) and its write address (write_addr) to the bus I/F unit 1. This operation is continued until all the "image data 1" for one frame has been processed and the data transfer to the external storage device 903 has been completed.

On the other hand, the "image data 2" is continuously generated by the image processor 2 and stored into the image buffer 4 by the image buffer controller 3, thus all the "image data 2" for one frame is stored into the image buffer 4.

That is, when image data is stored into the image buffer 4, two types of image data ("image data 1" and "image data 2") are simultaneously (to be more exact, time-divisionally) stored, and the "image data 1" is stored into the image buffer 4 while it is read out.

That is, in the image buffer 4, storage areas are independently allocated to the "image data 1" and the "image data 2", and the image buffer 4 is used as a "temporary storage buffer" regarding the "image data 1", while used as a "frame buffer" regarding the "image data 2".

Note that in the first embodiment, the image processing apparatus has two image processors, the image processor 2 and the image processor 5. The image processor 2 performs image data processing such as color correction, edge enhancement and γ conversion, while the image processor 5 performs compression coding by e.g. JPEG (Joint Photographic Coding Experts Group) or JPEG 2000 method.

When the image output controller 6 detects completion of transfer of the "image data 1" to the external storage device 903, the controller 6 issues a register preservation request signal (preserve_req) to the internal pseudo master 7.

Figure 2:
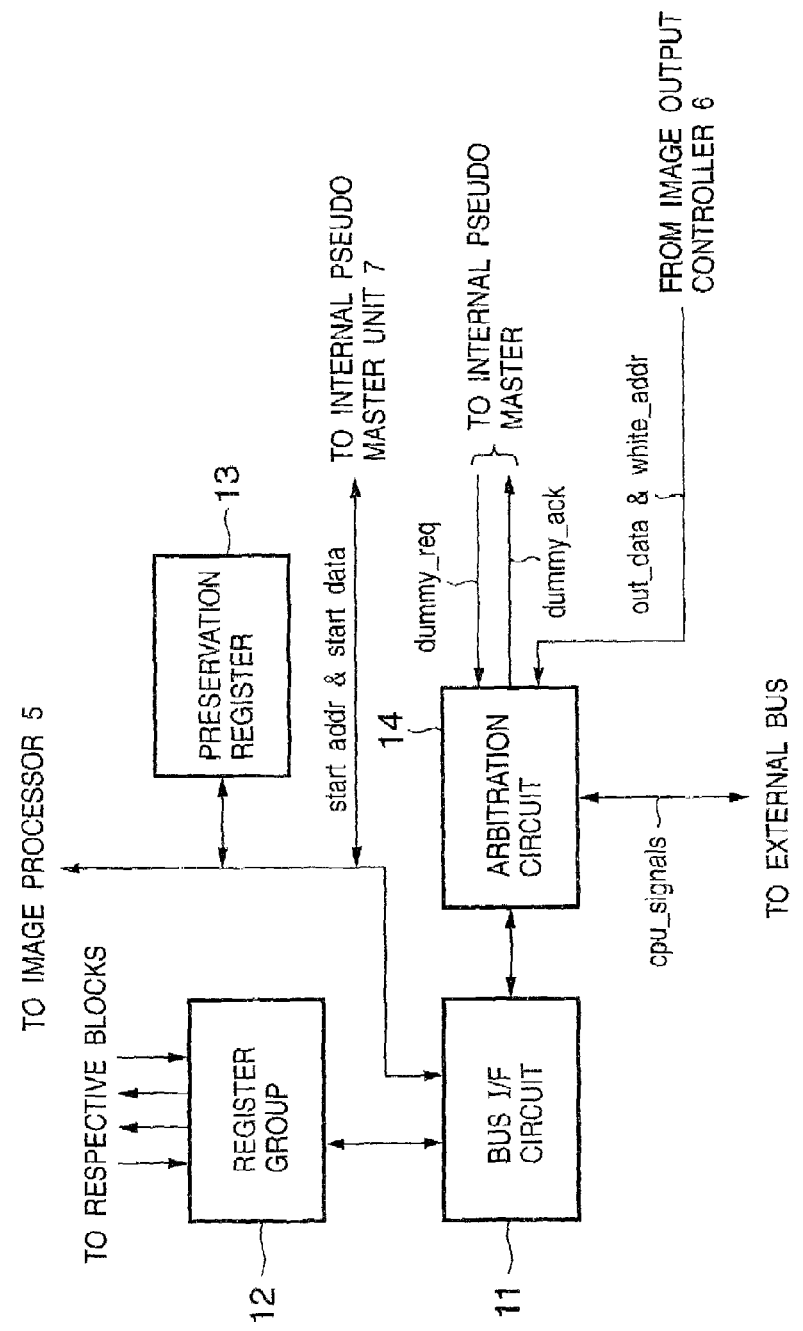
FIG. 2 is a block diagram showing the construction of a bus I/F unit according to the first embodiment.

The image processor 5 includes a status register 5a comprising plural registers for storing results of image processing (e.g., the amount of generated image data and an error status). In response to the register preservation request signal (preserve_req) from the image output controller 6, the internal pseudo master 7 stores a duplicate of the contents of the status register 5a of the image processor 5 in a preservation register (13: FIG. 2) of the bus I/F unit 1. When the duplication is completed, the internal pseudo master 7 issues a signal indicating the completion of register preservation (preserve_done) to the image output controller 6.

In response to the signal, the image output controller 6 performs startup for processing the "image data 2" by the image buffer controller 3 and the image processor 5. As this, the processing on the "image data 2" is automatically started. That is, the "image data 2" stored in the image buffer 4 is read from the image buffer 4 under the control of the image buffer controller 3, then processed by the image processor 5, and transferred through the image output controller 6, the bus I/F unit 1 and the external bus 101 to the external storage device 903.

Note that the processing on the "image data 2" may be automatically started by the internal pseudo master 7 besides the startup by the image output controller 6 as described above. That is, all the procedure corresponding to the conventional setting sequence by the external controller 901 may be performed by the internal pseudo master 7.

In the first embodiment, only the register preservation is performed by the internal pseudo master 7, and the startup for the processing on the "image data 2" is performed by the image output controller 6. In response to an activation signal (not shown) issued from the image output controller 6, the image buffer controller 3 and the image processor 5 respectively perform initialization and re-setting within an image processing blocks. The merit of this method is that the number of processing cycles is smaller than the case where all the procedure is performed by the internal pseudo master 7.

When the processing and transfer of the "image data 2" stored in the image buffer 4 have been completed, the image output controller 6 issues an interrupt request (interrupt) to the external controller 901. In response to the interrupt request, the external controller 901 performs reading from the preservation register 13 (i.e. the status of the "image data 1") and from the status register 5a of the image processor 5 (i.e. the status of the "image data 2"), and performs setting for the next frame. Upon completion of these setting operations, the external controller 901 clears an interrupt register for storing interrupt factors issued by the image processing apparatus 100. The image output controller 6 detects that the interrupt register has been cleared, then ends the processing on the current frame and moves to a stand-by status for the next frame.

FIG. 2 is a block diagram showing the construction of the bus I/F unit 1 of the image processing apparatus 100 according to the first embodiment.

In FIG. 2, numeral 11 denotes a bus interface (I/F) circuit; numeral 12 denotes a register group for transmission of various control signals between the apparatus and respective units to control operations of the respective units; numeral 13 denotes the above-described preservation register for preserving the contents of the status register 5a of the image processor 5; numeral 14 denotes an arbitration circuit which is a characteristic feature of the present embodiment, and which performs data transfer control between the internal pseudo master 7 and the external storage device 903 connected via the external bus 101.

In the above construction, usually, no access request is issued from the internal pseudo master 7, accordingly, an access request from the external controller 901 to the image processing apparatus 100 substantially passes through the arbitration circuit 14, and the external controller 901 can directly access to the register group 12, the image processor 5 or the like via the bus I/F circuit 11.

On the other hand, if the register preservation request (preserve_req) is issued from the image output controller 6 while the external controller 901 accesses the image processing apparatus 100, the internal pseudo master 7 issues an access request signal (dummy_req) to the arbitration circuit 14. By the access request signal, the arbitration circuit 14 waits for the completion of access from the external controller 901, and issues an access acknowledgment signal (dummy_ack) indicating an acknowledgment of register preservation operation to the internal pseudo master 7.

When the access acknowledgment signal (dummy_ack) is issued, the internal pseudo master 7 outputs an address (stat_addr) to read data in the status register 5a of the image processor 5, and stores a duplicate of the read data (stat_data) in the preservation register 13.

When the storage operation for all the data in the status register 5a has been completed, the internal pseudo master 7 withdraws the access request (dummy_req) to the arbitration circuit 14. In response to the withdrawal, the arbitration circuit 14 withdraws the access acknowledgment signal (dummy_ack) to the internal pseudo master 7. Then, as described above, the internal pseudo master 7 issues the register preservation completion signal (preserve_done) to the image output controller 6. Thus the preservation operation is completed.

Note that the address (stat_addr) to read data from the status register 5a is outputted only in a period where the access acknowledgment is issued, and in a period where the access acknowledgment is not issued, access from the external storage device 901 in normal times is not interfered.

Further, if the external controller 901 issues the access request while the bus I/F unit 1 performs the register preservation by the request from the internal pseudo master 7, the arbitration circuit 14 waits for the completion of register preservation operation, and issues the access acknowledgment to the external controller 901.

Note that in the present embodiment, if the access request from the external controller 901 and the register preservation request (preserve_req) simultaneously occur, the access request from the external controller 901 is first handled.

Figure 3:
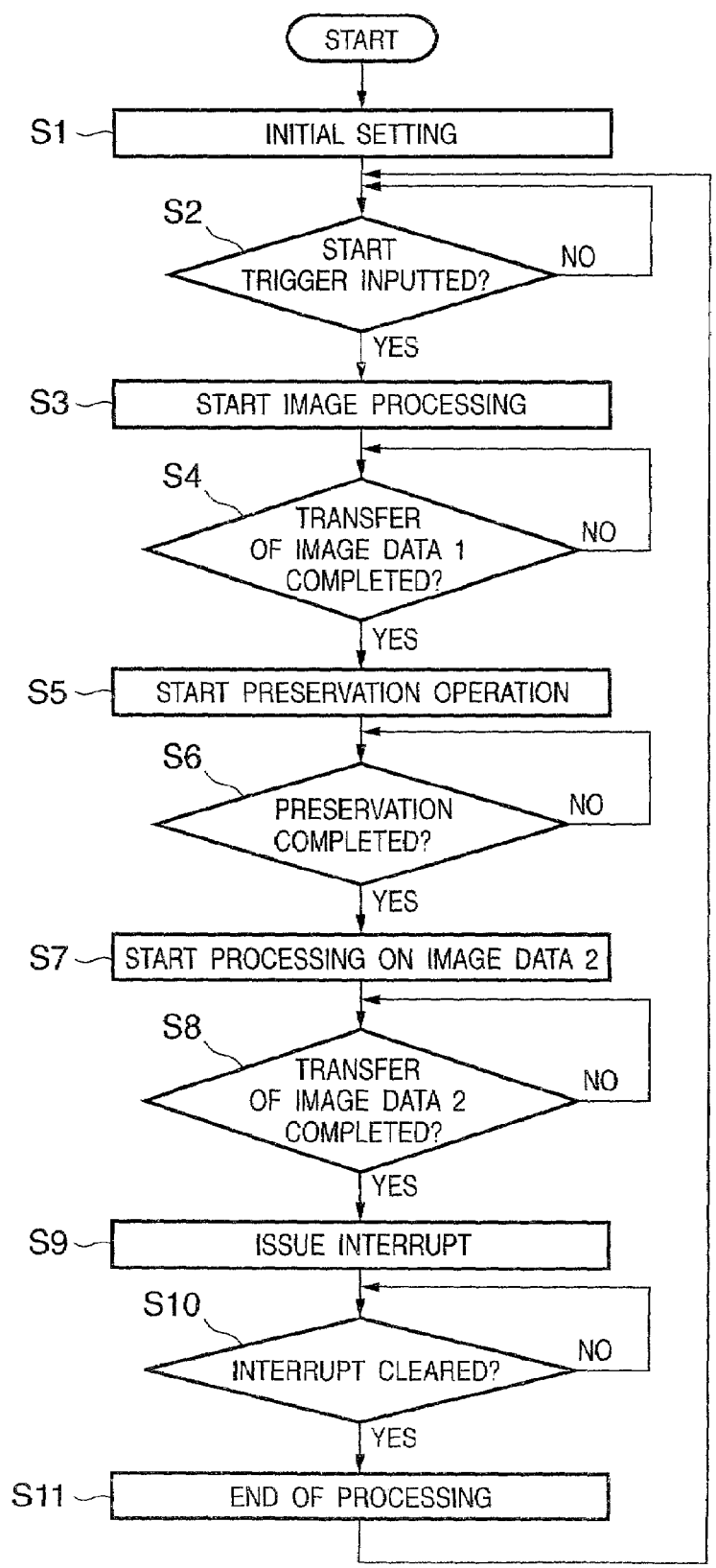
FIG. 3 is a flowchart showing the processing in the image processing apparatus according to the first embodiment.

FIG. 3 is a flowchart showing the flow of processing in the image processing apparatus 100 according to the first embodiment.

First, at step S1, initial setting processing is performed, then at step S2, if it is determined that the image processing start trigger (start_trg) is issued from the external data supply device 902, the process proceeds to step S3, at which image processing is started. That is, the image processor 2 inputs image data (d_in), then obtains two types of image data ("image data 1" and "image data 2"), and stores these two types of image data into the image buffer 4 respectively, through the image buffer controller 3.

The "image data 1" is temporarily stored in the image buffer 4, then transferred through the image processor 5, the image output controller 6 and the bus I/F unit 1, to the external storage device 903 via the external bus 101 and stored in the external storage device 903. The processing on the "image data 1" is continued until all the "image data 1" for one frame has been completed and transferred and stored in the external storage device 903.

On the other hand, the "image data 2" is continuously stored into the image buffer 4, thus all the "image data 2" for one frame has been stored into the image buffer 4. When the image output controller 6 detects the completion of transfer of the "image data 1", it issues the register preservation request (preserve_req) to the internal pseudo master 7 (step S5).

The image processor 5 has the status register 5a comprising plural registers for storing image processing results (e.g., the amount of generated image data and an error status). In response to the register preservation request (preserve_req), the internal pseudo master 7 stores a duplicate of the contents of the status register 5a into the preservation register 13 in the bus I/F unit 1. When the register preservation has been completed, the internal pseudo master 7 issues the register preservation completion (preserve_done) to the image output controller 6. Then the completion of data preservation is detected, and the process proceeds from step S6 to step S7.

At step S7, the image output controller 6 performs startup for processing the "image data 2" by the image buffer controller 3 and the image processor 5. Then the processing for reading and data transfer of the "image data 2" is automatically started. The "image data 2" is read from the image buffer 4, and transferred through the image processor 5, the image output controller 6 and the bus I/F unit 1 to the external storage device 903 via the external bus 101.

Note that the processing on the "image data 2" may be automatically started by the internal pseudo master 7 besides the startup by the image output controller 6 as described above. That is, all the procedure corresponding to the conventional setting sequence by the external controller 901 may be performed by the internal pseudo master 7, as described above. If it is determined at step S8 the transfer of the "image data 2" has been completed, the process proceeds to step S9, at which the image output controller 6 issues the interrupt request (interrupt) to the external controller 901. In response to the interrupt request, the external controller 901 performs reading from the preservation register 13 (i.e. the status of the "image data 1") and from the status register 5a of the image processor 5 (i.e. the status of the "image data 2"), and performs setting for the next frame. Upon completion of these operations, the external controller 901 clears the interrupt register for storing interrupt factors issued from the image processing apparatus 100. The image output controller 6 detects that the interrupt register has been cleared, then the process proceeds from step S10 to step S11 at which the processing on the current frame is ended, and moves to the stand-by at step S2 for the next frame.

As described above, according to the first embodiment, the image processing apparatus 100, having the internal pseudo master 7 which plays a part of roles of the external controller 901 and the preservation register 13 for preservation of the status register 5a of the image processor 5, automatically performs preservation of register value and re-setting necessary for image processing on the "image data 2" after completion of transfer of the "image data 1" to the external storage device 903, in the apparatus. In this construction, as a series of operations from the completion of transfer of the "image data 1" to the external storage device 903 to the start of processing on the "image data 2" by the image processor 5 can be performed within the image processing apparatus 100 without interrupt by the external controller 901, the suspension time of the processing is shorter in comparison with the conventional art, and the efficiency of image processing can be improved.

Further, in the external controller 901, as the number of suspensions of processing by interrupt requests from the image processing apparatus 100 decreases, the efficiency of processing can be improved.

Further, since the image processing apparatus 100 has the arbitration circuit 14 in the bus I/F unit for arbitration between the internal pseudo master 7 and the external controller 901, if the register preservation operation and the access request from the external controller 901 to the image processing apparatus 100 simultaneously occur, collision between the two operations (register preservation operation and access operation) can be avoided, and the two operations can be smoothly performed without failure.

As described above, the first embodiment has an object to increase the number of image data frames processible within a predetermined period, and to attain this object, the period of suspension in image data processing in the image processor is reduced. That is, the number of interrupt requests from the image processing apparatus 100 of the first embodiment to the external controller 901 is reduced. As a spillover advantage, the number of suspensions of processing in the external controller 901 is also reduces.

As a particular construction, the image processing apparatus of the first embodiment has the internal pseudo master 7 and the preservation register 13 for preservation of processing results of the "image data 1" (note that in the second embodiment to be described later, a preservation register for the "image data 2" is provided). Further, to automatically start the processing on the "image data 2", a function to activate the image buffer controller 3 and the image processor 5 from the image output controller 6 is provided. In this arrangement, control from the outside of the image processing apparatus is unnecessary upon transition from the processing on the "image data 1" to the processing on the "image data 2". Further, to complete the construction of the first embodiment, the arbitration circuit 14 for arbitration between the external storage device 903 and the internal pseudo master 7 is provided in the bus I/F unit 1 such that collision between the external storage device 903 and the internal pseudo master 7 can be avoided. In this arrangement, the interrupt request, which conventionally occurred in the middle of image processing, occurs only when the processing and data transfer of all the images ("image data 1" to "image data 2") (in the second embodiment, "image data 1" to "image data 3") have been completed. In other words, the number of interrupt requests is reduced.

Second Embodiment

Figure 4:
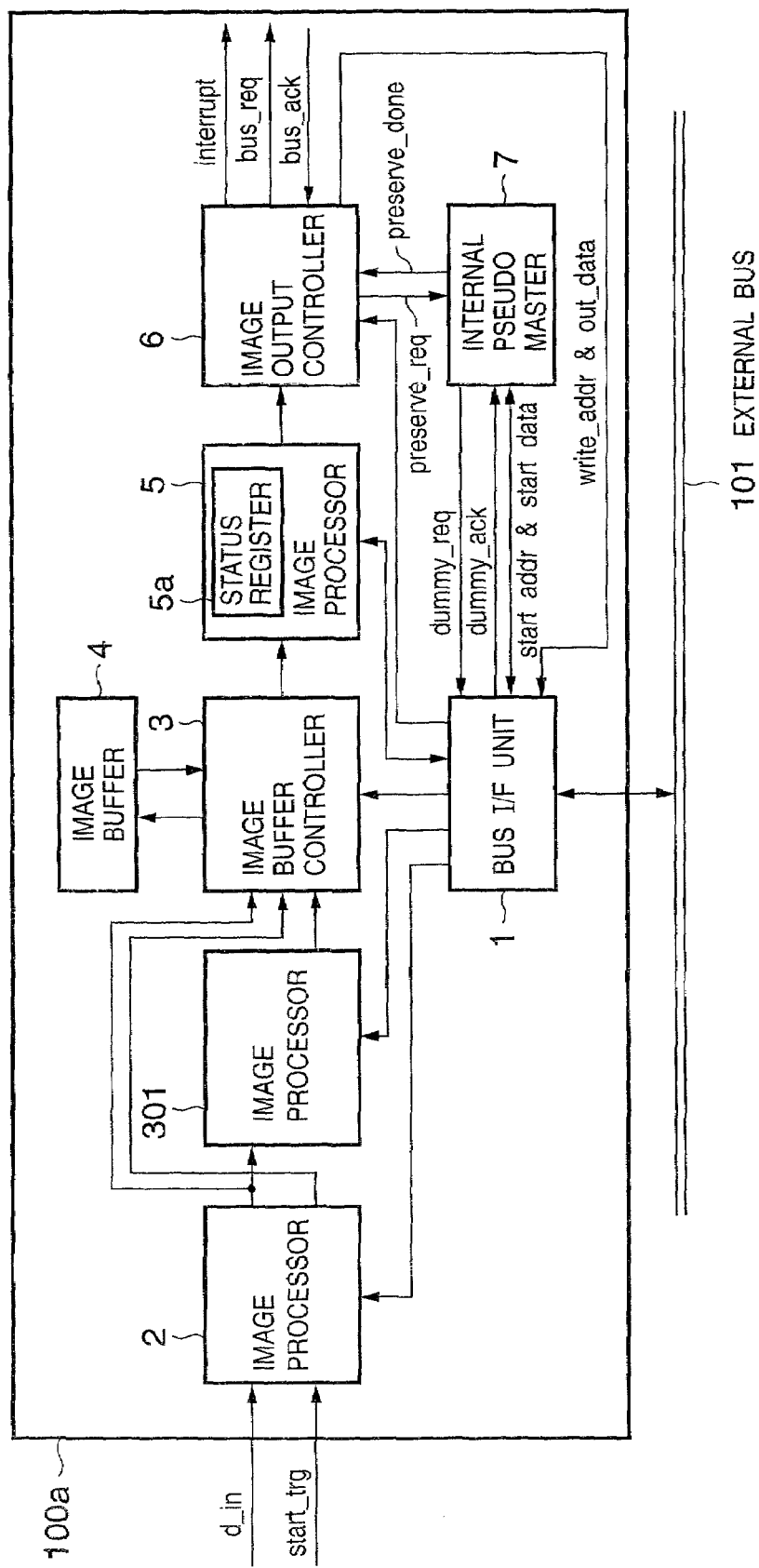
FIG. 4 is a block diagram showing the construction of the image processing apparatus according to a second embodiment of the present invention.

FIG. 4 is a block diagram showing the construction of an image processing apparatus 100a according to the second embodiment of the present invention. In FIG. 4, elements corresponding to those of the first embodiment have the same reference numerals and the explanations of the elements will be omitted. Note that in FIG. 4, for the sake of simple illustration, the external controller 901, the external data supply device 902 and the external storage device 903 in FIG. 1 are omitted.

The difference between the first embodiment and the second embodiment is that in the second embodiment, an image processor 301 is added between the image processor 2 and the image buffer controller 3. The image processor 301 inputs the "image data 1" in the above first embodiment and outputs a new image "image data 3" in parallel to outputs the "image data 1" and "image data 2".

Note that the "image data 3" corresponds to image data obtained by resolution conversion, filtering and the like on the "image data 1", having different resolution, filter coefficient, data bit precision (i.e. data bit width) and the like from those of the "image data 2. The "image data 3" is used as an image displayed on an LCD mounted in a product or an external display device (an LCD, a CRT and the like) of a product, for brief preview of the content of the "image data 1" (i.e., as an image showing the content in more detail in comparison with a thumb nail image).

Figure 5:
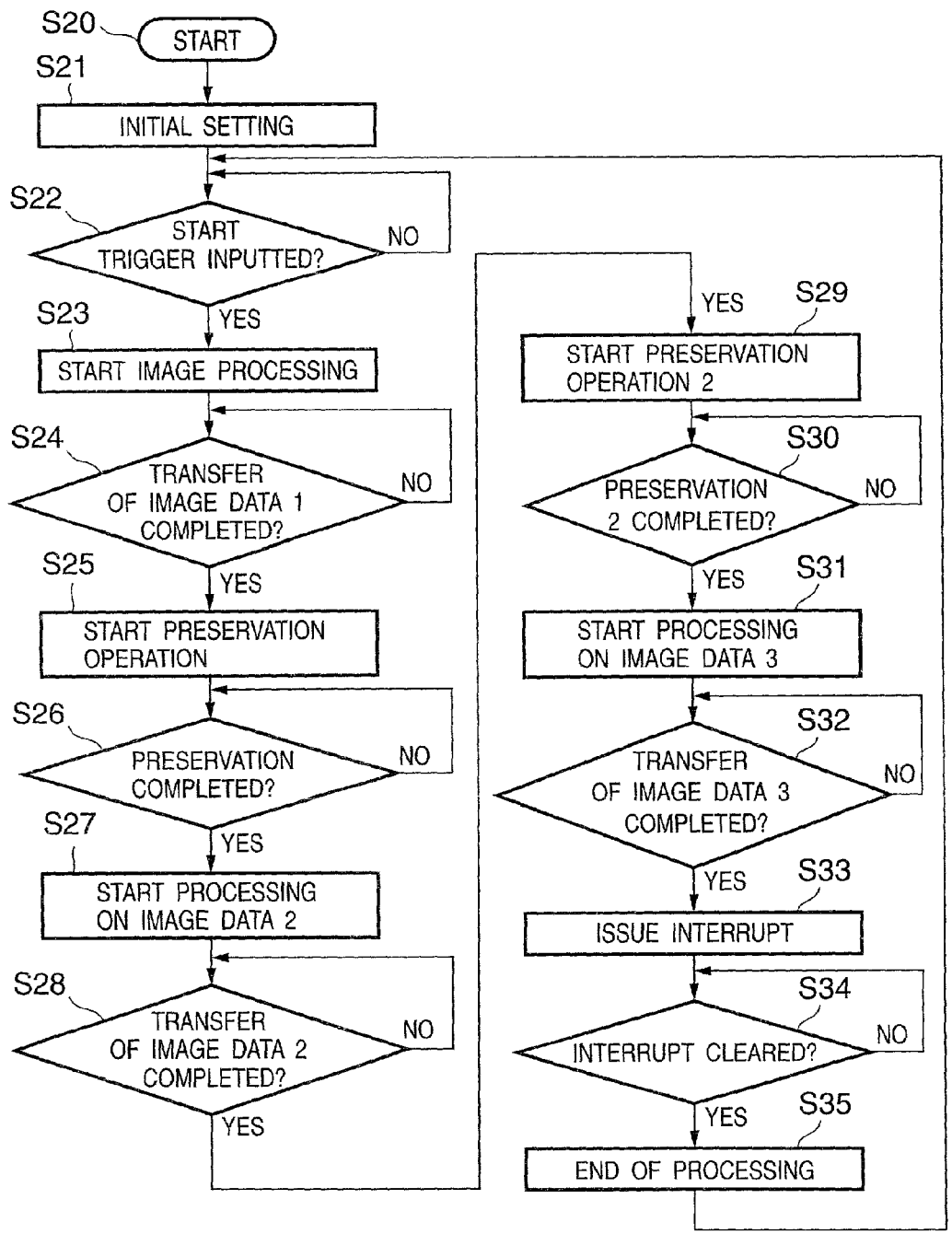
FIG. 5 is a flowchart showing the processing in the image processing apparatus according to the second embodiment.

FIG. 5 is a flowchart showing processing in the image processing apparatus 100a according to the second embodiment. Note that in FIG. 5, processing at steps S20 to S28 and processing at steps S33 to S35 are the same as those at steps S0 to S8 and steps S9 to S11, therefore, the detailed explanations of the processings will be omitted.

Hereinbelow, processing at step S29 and the subsequent steps will be described.

When the image output controller 6 detects the completion of transfer of the "image data 2", it issues the register preservation request (preserve_req) to the internal pseudo master 7 as in the case of the "image data 1". This is performed at step S29 to start a preservation operation 2 in FIG. 5.

In response to the register preservation request, the internal pseudo master 7 stores a duplicate of the contents of the status register 5a into the preservation register 13 in the bus I/F unit 1. Then the internal pseudo master 7 issues the register preservation completion (preserve_done) to the image output controller 6. When it is determined at step S30 that the register preservation is completed, the process proceeds from step S30 to step S31, at which the image output controller 6 performs activating for processing the "image data 3 " by the respective units of the image processing apparatus 100a, thereby the processing on the "image data 3" is automatically started. This is performed at step S31 to start the processing on the "image data 3". At this time, the "image data 3" is read from the image buffer 4, then processed by the image processor 5, and transferred through the image output controller 6 and the bus I/F unit 1, to the external storage device 903 via the external bus 101 (steps S31

Note that the preservation register 13 in the bus I/F unit 1 has an area for preservation of the result of processing on the "image data 2" aside from that for preservation of the result of processing on the "image data 1".

When the data transfer of the "image data 3" has been completed, the image output controller 6 issues the interrupt request (interrupt) to the external controller 901 (step S33). In response to the interrupt request (interrupt), the external controller 901 performs reading from the preservation register 13 (i.e. the statuses of the "image data 1" and the "image data 2") and from the status register 5a of the image processor 5 (i.e. the status of the "image data 3"), and performs setting of the processors and units for the next frame. Upon completion of these operations, the external controller 901 clears the interrupt registers for storing interrupt factors issued from the image processing apparatus 100. The image output controller 6 detects that the interrupt register has been cleared, then ends the processing on the current frame and moves to the stand-by at step S2 for the next frame.

As described above, in addition to the above-described advantages obtained in the first embodiment, the second embodiment has an advantage that suspension time in the processing from the completion of data transfer of the "image data 2" to the external storage device to the start of the processing on the "image data 3" is reduced in comparison with the conventional art, and the efficiency of processing is improved.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the functions of the above-described embodiments to a system or an apparatus, reading the program code with a computer (e.g., CPU, MPU) of the system or apparatus from the storage medium, then executing the program. In this case, the program code read from the storage medium itself realizes the functions according to the embodiments, and the storage medium storing the program code constitutes the invention. Furthermore, besides aforesaid functions according to the above embodiments are realized by executing the program code which is read by the computer, the present invention includes a case where an OS (operating system) or the like working on the computer performs a part or entire processes in accordance with designations of the program code and realizes the functions according to the above embodiments.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiments.

As described above, according to the first embodiment of the present invention, the suspension time in processing from the completion of transfer of the "image data 1" to the external storage device to the start of processing on the "image data 2" is reduced in comparison with the conventional art, and the efficiency of processing is improved.

Further, according to the second embodiment of the present invention, the suspension time in processing from the completion of transfer of the "image data 2" to the external storage device to the start of processing on the "image data 3" is reduced in comparison with the conventional art, and the efficiency of processing is improved.

Further, in the external controller, as the number of suspensions by interrupt requests from the image processing apparatus decreases, the efficiency of processing is improved.

The present invention is not limited to the above embodiments and various changes and modifications can be made within the spirit and scope of the present invention. Therefore, to appraise the public of the scope of the present invention, the following claims are made.

What is claimed is:

1. An image processing apparatus connected to at least an external controller via an external bus, comprising:
    first image processing means for processing input image data and for generating first and second image data from the input image data;
    image storage means for storing the first and second image data processed by said first image processing means;
    second image processing means for processing the first and second image data read from said image storage means;
    output control means for outputting image data processed by said second image processing means via the external bus;

preservation means for preserving a status of the result of processing on the first image data by said second processing means; and pseudo master means for controlling a preservation operation by said preservation means, in correspondence with output completion of the first image data by said output control means, wherein said first image processing means generates the second image data while said output control means outputs the first image data processed by said second image processing means, and said second image processing means starts processing the second image data, in correspondence with output completion of the first image data by said output control means.

2. The image processing apparatus according to claim 1, wherein one or both of said output control means and said pseudo master means start output processing on the second image data stored in said image storage means, in correspondence with output completion of the first image data by said output control means.

3. The image processing apparatus according to claim 1, wherein said preservation means preserves the status of the result of image data processing corresponding to each of the first and second of image data.

4. The image processing apparatus according to claim 3, wherein said pseudo master means controls the preservation operation by said preservation means, in correspondence with the output completion by said output control means of the first of image data processed by said second image processing means, for one frame, to the external bus.

5. The image processing apparatus according to claim 3, wherein said output control means issues an interrupt request to the external controller when transfer of the first and second image data of one frame, processed by said second image processing means to the external bus is completed, wherein the external controller performs reading of the result of processing preserved in said preservation means and setting for image processing on the next frame, in correspondence with the interrupt request.

6. The image processing apparatus according to claim 1, further comprising arbitration means for arbitration between an access request from the external controller and the preservation operation of the status of the result of processing by said pseudo master means and said preservation means.

7. The image processing apparatus according to claim 1, wherein said first image processing means includes first processing means for generating the first image data and second processing means for generating the second image data.

8. The image processing apparatus according to claim 7, wherein the first image data has a resolution higher than that of the second image data.

9. The image processing apparatus according to claim 1, wherein said first image processing means performs filter processing on the input image data, while the second image processing means performs compression coding processing on the first image data.

10. The image processing apparatus according to claim 9, wherein said compression coding processing is coding processing in conformity with JPEG or JPEG 2000 coding method.

11. An apparatus according to claim 1, wherein said preservation means preserves the status of the result of processing the first image data, and said output control means requests the external controller to read the status of the result of processing the second image data by said second image processing means, and the status of the result of processing the first image data by said second image processing means, which is preserved by said preservation means.

12. An image processing method in an image processing apparatus connected to at least an external controller via an external bus, comprising:

a first image processing step of processing input image data and of generating first and second image data from the input image data;

an image storage step of storing the first and second image data processed in said first image processing step into an image memory;

a second image processing step of processing the first and second image data read from the image memory;

an output control step of outputting image data processed in said second image processing step via the external bus;

a preservation step of preserving a status of the result of processing on the first image data processed in said second processing step; and a pseudo master step of controlling a preservation operation in said preservation step, in correspondence with output completion of the first image data in said output control step, wherein in said first image processing step, the second image data is generated while the first image data processed by said second image processing step is output in said output control step, and said second image processing step starts processing of the second image data, in correspondence with output completion of the first image data in said output control step.

13. The image processing method according to claim 12, wherein in one or both of said output control step and said pseudo master step, output processing on the second image data stored in said image storage step is started, in correspondence with output completion of the first image data in said output control step.

14. The image processing method according to claim 12, wherein in said preservation step, the status of the results of the first and second image data processing, corresponding to each of the first and second image data, is preserved.

15. The image processing method according to claim 14, wherein in said pseudo master step, the preservation operation in said preservation step is controlled, in correspondence with the output completion in said output control step of the first and second image data processed in said second image processing step, for one frame, to the external bus.

16. The image processing method according to claim 14, wherein in said output control step, an interrupt request is issued to the external controller, when transfer of the first and second image data of one frame, processed in said second image processing step to the external bus is completed, wherein the external controller performs reading of the result of processing preserved in said preservation step and setting for image processing on the next frame, in correspondence with the interrupt request.

17. The image processing method according to claim 12, further comprising an arbitration step of performing arbitration between an access request from the external controller and said preservation operation of the status of the result of processing in said pseudo master step and said preservation step.

18. A computer-readable medium storing computer-readable program code for executing the image processing method according to claim 12.

19. A method according to claim 12, wherein in said preservation step, the status of result of processing first input image data is preserved, and in said output control step, the external controller is requested to read the status of the result of processing second input image data in said second image processing step, and the status of the result of processing first input image data in said second image processing step, which is preserved in said preservation step.

* * * * *

UNITED STATES PATENT AND TRADEMARK OFFICE
CERTIFICATE OF CORRECTION

PATENT NO. : 7,321,438 B2
APPLICATION NO. : 10/050780
DATED : January 22, 2008
INVENTOR(S) : Shunichi Kaizu It is certified that error appears in the above-identified patent and that said Letters Patent is hereby corrected as shown below:

COLUMN 4

Line 22, "thumb nail" should read --thumbnail--;
    Line 48, close up right margin; and
    Line 49, close up left margin.

COLUMN 5

Line 32, "blocks." should read --block.--.

COLUMN 8

Line 18, "reduces." should read --reduced.--; and
    Line 60, "in parallel to outputs" should read --as well as outputting--.

COLUMN 9

Line 4, "thumb nail" should read --thumbnail--;
    Line 7, "S20" should read --S21--;
    Line 9, "S0" should read --S1--; and
    Line 36, "S31" should read --S31 to S32).--.

COLUMN 10

Line 50, "appraise" should read --apprise--.

Signed and Sealed this

Second Day of September, 2008

JON W. DUDAS
*Director of the United States Patent and Trademark Office*